(12) United States Patent
Garner et al.

(10) Patent No.: US 7,174,394 B1
(45) Date of Patent: Feb. 6, 2007

(54) MULTI PROCESSOR ENQUEUE PACKET CIRCUIT

(75) Inventors: Trevor Garner, Apex, NC (US);
Kenneth H. Potter, Raleigh, NC (US);
Robert Leroy King, Raleigh, NC (US);
William R. Lee, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 382 days.

(21) Appl. No.: 10/171,957

(22) Filed: Jun. 14, 2002

(51) Int. Cl.
*G06F 3/00* (2006.01)

(52) U.S. Cl. .................. 710/5; 710/7; 710/52; 712/225
(58) Field of Classification Search ............... 710/5–7, 710/52–57; 711/147–153; 712/225
See application file for complete search history.

(56) References Cited

U.S. PATENT DOCUMENTS

| | | | |
|---|---|---|---|
| 5,448,708 A * | 9/1995 | Ward | 709/235 |
| 5,592,625 A * | 1/1997 | Sandberg | 711/147 |
| 6,044,438 A * | 3/2000 | Olnowich | 711/130 |
| 6,438,678 B1 | 8/2002 | Cashman et al. | |
| 6,484,224 B1 | 11/2002 | Robins et al. | |
| 6,505,269 B1 | 1/2003 | Potter | |
| 6,519,672 B2 * | 2/2003 | Scardamalia et al. | 710/317 |
| 6,529,983 B1 | 3/2003 | Marshall et al. | |
| 6,564,267 B1 * | 5/2003 | Lindsay | 709/250 |
| 6,850,516 B2 * | 2/2005 | Lawson et al. | 370/357 |
| 7,006,505 B1 * | 2/2006 | Bleszynski et al. | 370/395.72 |

* cited by examiner

*Primary Examiner*—Kim Huynh
*Assistant Examiner*—Eron J. Sorrell
(74) *Attorney, Agent, or Firm*—Cesari and McKenna LLP (57) ABSTRACT

The present invention provides a system and method for a plurality of independent processors to simultaneously assemble requests in a context memory coupled to a coprocessor. A write manager coupled to the context memory organizes segments received from multiple processors to form requests for the coprocessor. Each received segment indicates a location in the context memory, such as an indexed memory block, where the segment should be stored. Illustratively, the write manager parses the received segments to their appropriate blocks of the context memory, and detects when the last segment for a request has been received. The last segment may be identified according to a predetermined address bit, e.g. an upper order bit, that is set. When the write manager receives the last segment for a request, the write manager (1) finishes assembling the request in a block of the context memory, (2) enqueues an index associated with the memory block in an index FIFO, and (3) sets a valid bit associated with memory block. By setting the valid bit, the write manager prevents newly received segments from overwriting the assembled request that has not yet been forwarded to the coprocessor. When an index reaches the head of the index FIFO, a request is dequeued from the indexed block of the context memory and forwarded to the coprocessor.

44 Claims, 8 Drawing Sheets

FIG. 8

MULTI PROCESSOR ENQUEUE PACKET CIRCUIT

FIELD OF THE INVENTION

This invention relates generally to coprocessors, and more specifically, to enqueueing requests from multiple processors to a single coprocessor.

BACKGROUND OF THE INVENTION

A computer network is a geographically distributed collection of interconnected subnetworks for transporting data between nodes, such as computers. A local area network (LAN) is an example of such a subnetwork; a plurality of LANs may be further interconnected by an intermediate network node, such as a router or switch, to extend the effective "size" of the computer network and increase the number of communicating nodes. The nodes typically communicate by exchanging discrete packets of data according to predefined protocols. The data packets transferred among the nodes may include fixed sized data cells and/or variable sized data frames. In this context, a protocol consists of a set of rules defining how the nodes interact with each other.

Broadly stated, an intermediate network node is configured to exchange data packets between nodes connected to a wide range of communication links and subnetworks. To that end, the intermediate node implements a set of network services for the communicating nodes. The set of services may include route processing, path determination and path switching functions. The route processing function determines the type needed for a received packet, whereas the path switching function allows the intermediate node to accept a packet on a first interface and forward it on a second interface. The path determination, or forwarding decision, function selects the most appropriate interface for forwarding a packet.

To perform a set of network services, an intermediate network node includes a processing engine. The processing engine may be a single processor programmed, in hardware and/or software, to implement route processing, path determination and path switching functions for packets received by the intermediate node. However, depending on the complexity of the network services provided, the processing engine may be implemented in a number of different architectures, including, but not limited to, field-programmable gate arrays (FPGA), application-specific integrated circuits (ASIC) and multiprocessor configurations.

In some multiprocessor implementations, the functions of the processing engine are distributed among a plurality of processors and coprocessors. As used herein, a coprocessor is a special-purpose processing unit that assists other processing units, such as general-purpose processors, in performing certain types of operations. For example, general-purpose processors in an intermediate node may be configured to perform route processing and path switching functions, whereas an associated coprocessor is configured to perform path determinations. In this case, the general-purpose processors "off-load" path determination functions to the coprocessor, which may be optimized to handle such operations in a fast and efficient manner.

Thus, in a multiprocessor architecture for a processing engine, a plurality of general-purpose processors may rely on a single coprocessor that is optimized to perform a subset of network services, such as path determinations. However, a problem arises when the multiple processors simultaneously request the services of the coprocessor. This problem is exacerbated if the coprocessor is configured to operate on requests serially, e.g. one at a time. In this case, the processors may transfer requests to the coprocessor faster than the coprocessor can process them, resulting in undesirable and unexpected latencies.

For example, assume multiple processors send requests to a coprocessor to perform a subset of network services. Each processor assembles a request in its local memory and sends the request as a sequence of packets to the coprocessor. A processor "assembles" a request by transferring individual portions of the request to its local memory. System limitations, such as bus bandwidth, software protocols, memory latencies, etc., may prevent the processor from transferring the assembled request to the coprocessor as a single transmission. Therefore, each processor in turn typically segments a request and sends it as a series of individual packets. In response, the coprocessor (i) receives the packets of each request, (ii) reassembles those packets in the request and (iii) enqueues the request in a buffer, such as a first-in, first out (FIFO) queue. Thereafter, the coprocessor processes the requests one at a time. Clearly, there is latency associated with such serial processing of requests, despite the optimized configuration of the coprocessor to efficiently handle certain operations. The present invention is directed to reducing this latency and allows multiple processors to assemble requests simultaneously in a random order.

SUMMARY OF THE INVENTION

The present invention overcomes the disadvantages of the prior art by decreasing the latency of processing requests sent from a plurality of processors to a coprocessor. Specifically, the invention provides a system and method for the processors to assemble requests in a remote memory coupled to the coprocessor. That is, rather than assembling their requests in their local memories and then transferring those requests as packets to the coprocessor, the processors assemble the requests in the remote memory of the coprocessor. This enables enqueuing of requests for the coprocessor as soon as they are assembled in the remote memory. The system and method thus eliminates the need for the coprocessor to receive and reassemble the requests for a coprocessor configured to process requests serially (i.e., one at a time), substantially increases the efficiency of processing those requests.

In the illustrative embodiment, each processor is coupled to the coprocessor over a communication link, such as a split transaction bus. Preferably, the processors off-load selected data manipulations, such as network services, to the coprocessor for execution in a fast and more efficient manner. To that end, the processors assemble requests for the specific data manipulations in the remote memory for processing by the coprocessor in the order in which they are assembled. The remote memory is preferably a common "context memory" coupled to the coprocessor.

According to the invention, multiple processors may simultaneously assemble requests in the context memory. The context memory is partitioned into discrete memory blocks such that requests for the coprocessor are concurrently assembled in different blocks of the context memory. For example, Processor A may transfer data to a first block of the context memory as it assembles a request for the coprocessor. The next data transfer to the context memory may be from Processor B as it assembles a different request in a second block of the context memory. In this way, different requests for the coprocessor are simultaneously assembled in the context memory by one or more processors. Preferably, the memory blocks in the context memory are of a fixed size starting at predetermined addresses, although it is expressly contemplated the blocks may be variable sizes according to static or dynamic memory allocation.

Because multiple processors may concurrently "build" requests in the context memory, a write manager implements ordering rules for transferring assembled requests from the context memory to the coprocessor. Each block of the context memory is illustratively associated with a unique index number. The write manager enqueues these indexes in a first-in, first-out (FIFO) queue or "index FIFO" according to the order requests are assembled in the context memory. For instance, if a first request is assembled in a memory block having an index of M before a second request is assembled in a memory block having an index of N, then the write manager enqueues the value M into the index FIFO before enqueueing the value N. Thereafter, the write manager sets a "valid" bit associated with the memory block. The valid bit indicates that (i) the block of memory comprises an assembled request that may be forwarded to the coprocessor and (ii) no new data may be written to the block of context memory until its assembled request is forwarded and/or processed by the coprocessor.

Operationally, a processor assembles a request for a coprocessor by transferring one or more segments of the request to an addressed block of the context memory. Each segment includes an address which indicates the memory block within the context memory and an offset within the memory block. The segment also includes the data to be placed in the memory. The length of the data to be placed in the memory can be as small as a single bit up to a maximum transfer size. The segments may be transferred by the processor to the context memory in any order. On the last transfer of the request, the processor sets a predetermined address bit, e.g. an upper order bit in the segment, to indicate the request is complete. As segments of the request are received from the processor, a write manager organizes the received segments in the block of context memory until the last segment is detected based on the predetermined address bit. Upon receiving the last segment of the request, the write manager finishes assembling the request and enqueues the index of the memory block in an index FIFO. The write manager also sets a valid bit associated with the memory block to prevent new requests from overwriting the assembled request.

When the index reaches the "head" of the index FIFO, a control circuit dequeues the index and transfers the assembled request from the context memory to a "request FIFO." In addition, the control circuit may reset the valid bit thereby allowing a new request to be assembled in the block of context memory. When the assembled request reaches the head of the request FIFO, it is forwarded to the coprocessor for processing.

Advantageously, the invention reduces the latency associated with processing requests by allowing multiple processors to assemble requests simultaneously in a random order to be processed by the coprocessor.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A. Intermediate Nodes in a Network

Figure 1:
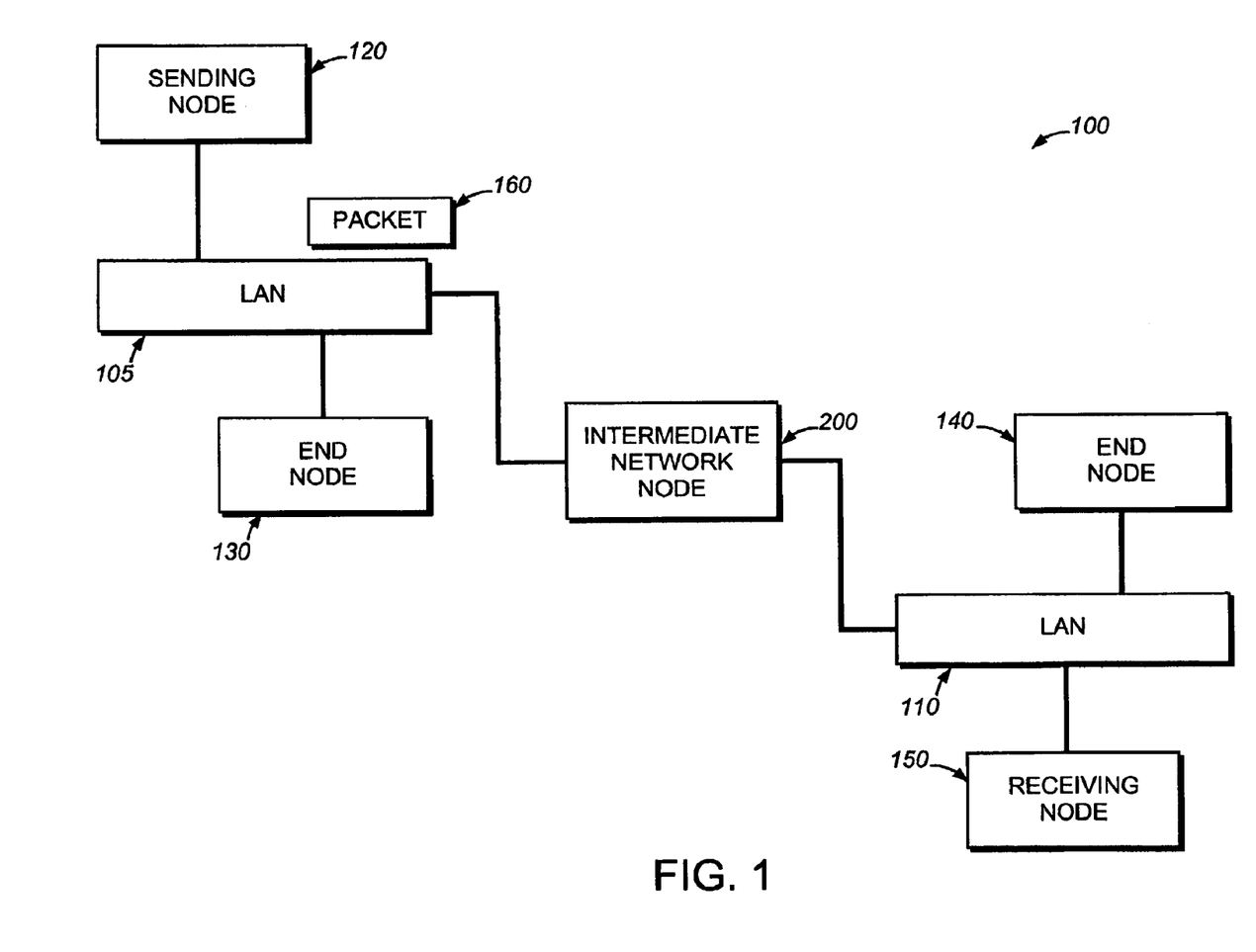
FIG. 1 is a schematic block diagram of a computer network comprising a collection of interconnected subnetworks and nodes, including an intermediate network node.

FIG. 1 is a block diagram of a computer network 100 comprising a collection of interconnected subnetworks and nodes. The nodes may comprise computers including end nodes 130 and 140, such as a sending end node 120 and a receiving end node 150, and an intermediate network node 200, the latter of which may be a switch or router. The subnetworks 105, 110 included within network 100 are preferably local area networks (LANs) interconnected by the intermediate node 200, although the networks may comprise other communication links, such as wide area networks. Communication among the nodes coupled to the LANs is typically effected by exchanging discrete packets 160 among the nodes.

For example, the sending node 120 generates a data packet 160 by encapsulating "payload" data within headers, such as conventional data link and network layer headers, as the data passes through different layers of a protocol stack. The packet is then transmitted over the network to the intermediate node 200 which facilitates the flow of the data packet through the network by routing it to the proper receiving node 150. Specifically, the node 200 receives the packet from an input port, parses the data link and network layer headers, renders a forwarding decision for the packet, appends a new data link header to the packet and then transmits the packet to an output port.

Figure 2:
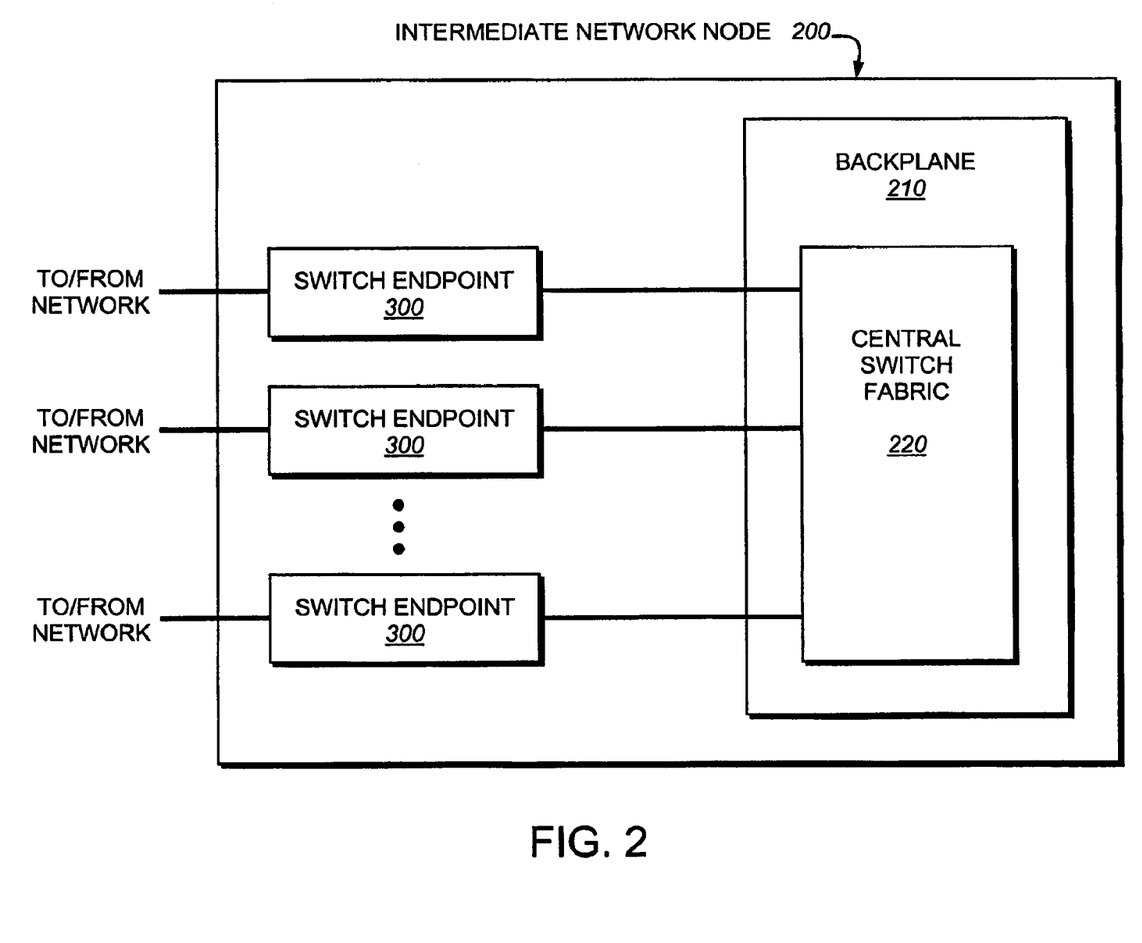
FIG. 2 is a schematic block diagram of an illustrative intermediate network node.

FIG. 2 is a schematic block diagram of an exemplary intermediate node 200. The node includes a plurality of switch endpoints 300 connected to a backplane 210. The backplane provides a medium for transferring data and signals from one switch endpoint to another and may include buses and logic in addition to a central switch fabric 220. The central switch fabric is responsible for redirecting the data and signals between switch endpoints. Each switch endpoint is connected to a respective network, such as a local area network or a wide area network, and to the central switch fabric.

Illustratively, a data packet is received from a network connected to a first switch endpoint. The received data is stripped of its network headers and new headers are prepended to the data packet based on a decision made by a forwarding engine, e.g. in the first endpoint. The forwarding engine may compose one or more processors programmed to "switch" (forward) data packets. The forwarded data is sent to the backplane and switched by switch fabric to a second endpoint indicated in the newly appended headers.

Figure 3:
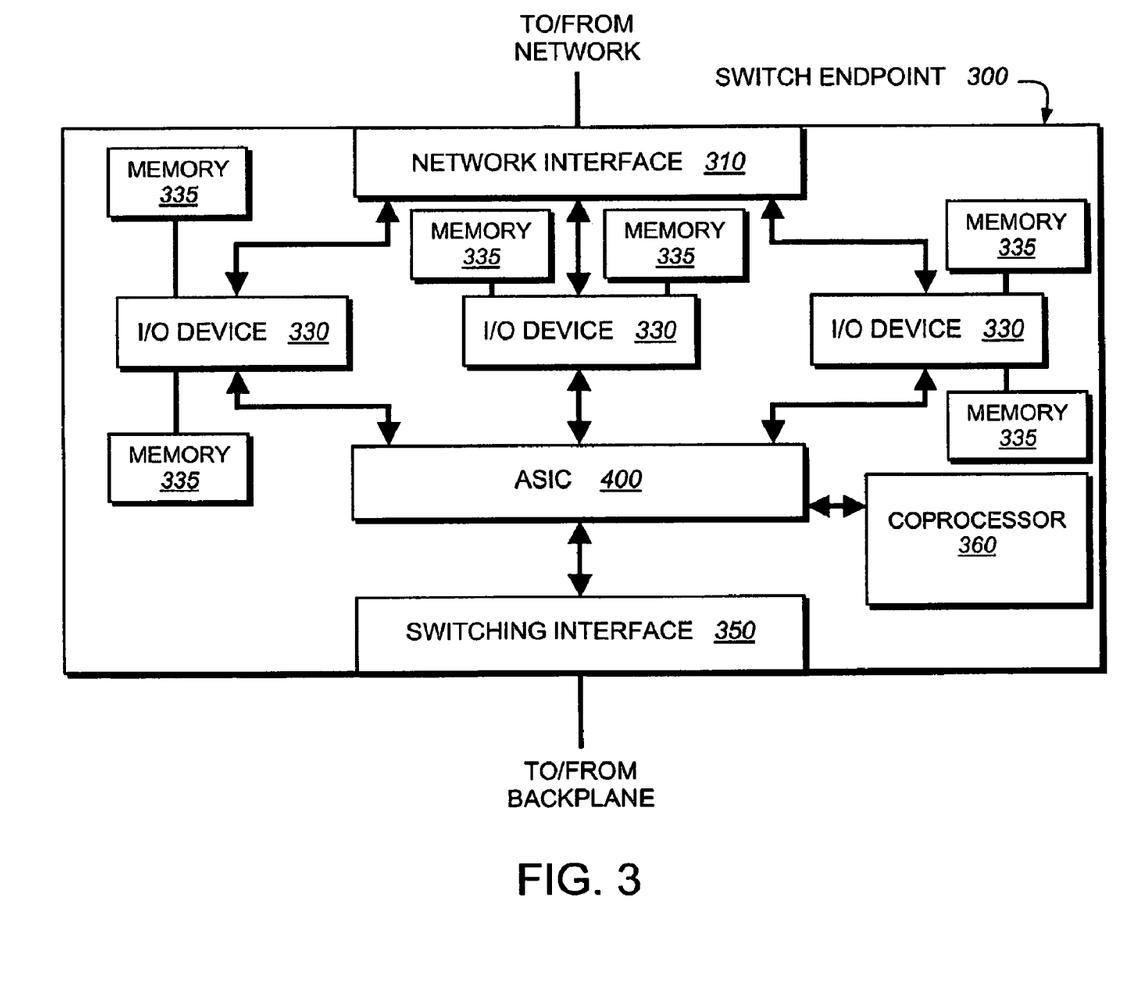
FIG. 3 is a schematic block diagram of a switch endpoint that may be implemented in the intermediate node of FIG. 2.

FIG. 3 illustrates a schematic block diagram of an exemplary switch endpoint 300. The endpoint comprises a network interface 310, a plurality of I/O devices 330, an ASIC 400, a switching interface 350 and a coprocessor 360. The switch endpoint communicates with a network through a network interface 310 that includes, inter alia, transceivers, input and output ports and drivers that transmit data to/from the network. The network interface is typically configured to transmit and receive data according to a predefined network protocol, such as an Ethernet or TCP/IP protocol.

A plurality of I/O devices 330 are coupled to network interface 310. The I/O devices access data received by the network interface and store the data in one or more associated memories 335. The I/O devices may also process the received data, e.g. by stripping network headers and error-checking the data. In addition, a subset of network services may be implemented by one or more of the I/O devices. Thus, it will be apparent to those skilled in the art that the devices 330 may be embodied as a processing engine having a plurality of general-purpose processors, application-specific integrated circuitry, and/or specialized processors, depending on the types of processing required for data transferred to and from the network.

An ASIC 400 transfers data between the memories 335 attached to the I/O devices and a switching interface 350 that, in turn, transmits data to/from backplane 210. An I/O device may interface with the ASIC using a standard bus protocol, associated with, e.g., a conventional peripheral computer interconnect (PCI) bus or HyperTransport bus. However, the switching interface 350 may expect data transfers using a different bus protocol used with, e.g., a common switch interface (CSIX) bus. Thus, when data is transferred from an I/O device to the switching interface (or vice versa), the ASIC may convert the data from one bus protocol to another.

As shown, the ASIC 400 also transfers data between the I/O devices and a coprocessor 360. Alternatively, a separate processing unit, such as another ASIC, may be configured to transfer data to/from the coprocessor and the I/O devices. The I/O devices off-load selected data manipulations, such as network services, to the coprocessor which is configured to execute these manipulations faster or more efficiently. According to the invention, requests to perform the data manipulations may be assembled in the ASIC and forwarded to the coprocessor. Similarly, corresponding responses generated by the coprocessor may be returned to the I/O devices via the ASIC.

B. Forwarding Requests from a Plurality of I/O Devices to a Coprocessor

Figure 4:
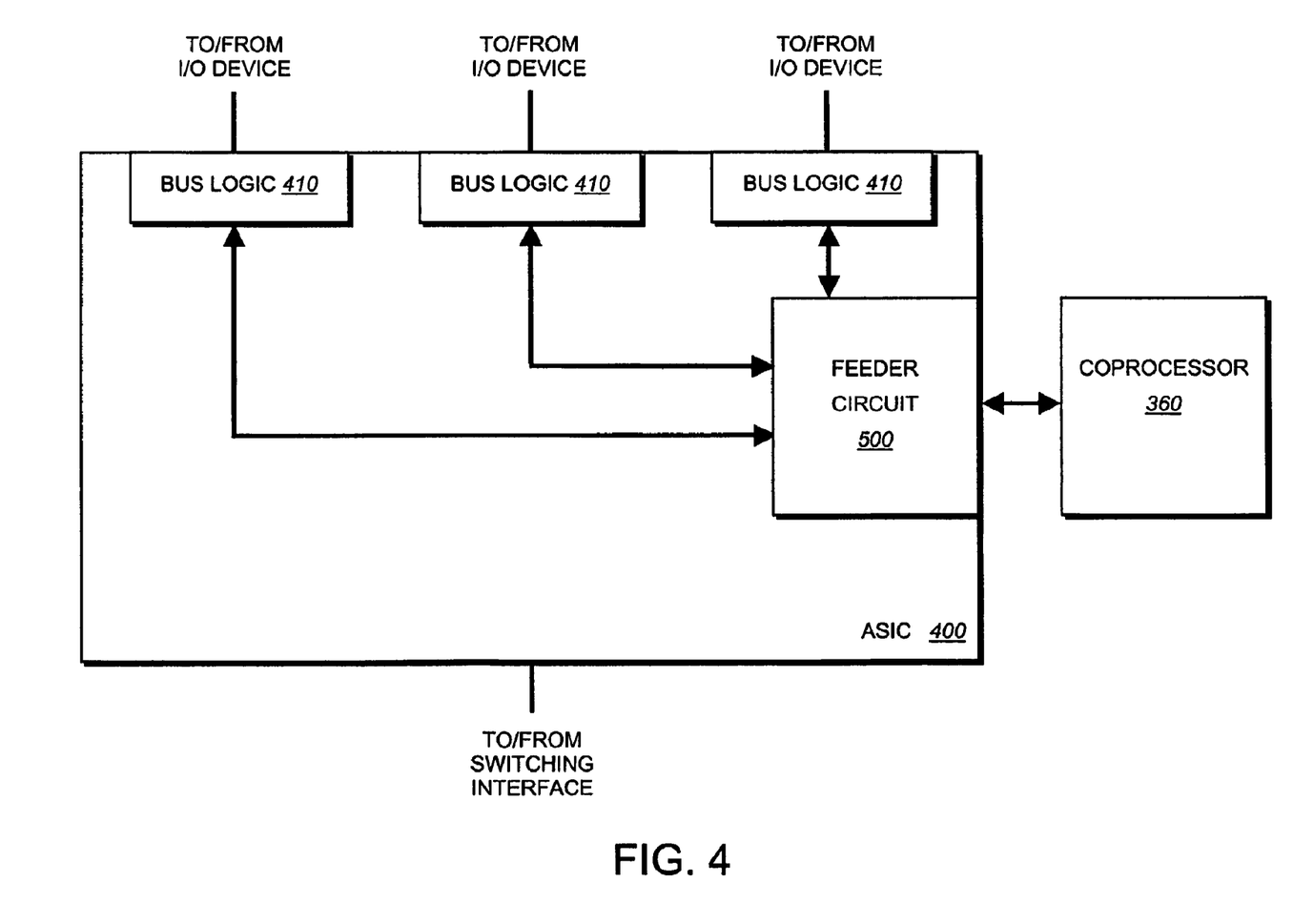
FIG. 4 is a schematic block diagram of an ASIC that may be implemented within the switch endpoint of FIG. 3.

FIG. 4 illustrates a schematic block diagram of an ASIC 400 that bridges communications between a plurality of I/O devices, such as general-purpose processors, and a coprocessor 360. The ASIC also bridges communications between the I/O devices and a switching interface, although the logic and circuitry relating to this interface has been omitted for reasons of clarity.

The illustrated ASIC includes bus logic 410 that interfaces with communication links, such as split transaction buses, coupled to each of the I/O devices. The bus logic comprises, inter alia, transceivers, logic and queues to "drive" data on and take data off each respective bus. Although three communication links are shown coupled to the logic 410, those skilled in the art will understand any arbitrary number may be connected depending on the number of I/O devices coupled to the ASIC. Data received by the bus logic may be transferred to a feeder circuit 500. The feeder circuit comprises transceivers, logic and memory as well as specialized circuitry for bridging communications to/from the I/O devices and the coprocessor.

In operation, request segments are received by the bus logic and forwarded to the feeder circuit. The segments may comprise data processing requests, or portions of data processing requests, off-loaded by the I/O devices to the coprocessor. Control logic in the feeder circuit organizes the received segments and transfers them to the coprocessor according to a set of predetermined ordering rules. The coprocessor may be configured to serially receive and process the data from the control logic. When appropriate, the coprocessor returns processed segments to the feeder circuit, which, in turn, transfers the data to the bus logic whereupon they are returned to one or more of the I/O devices.

Figure 5:
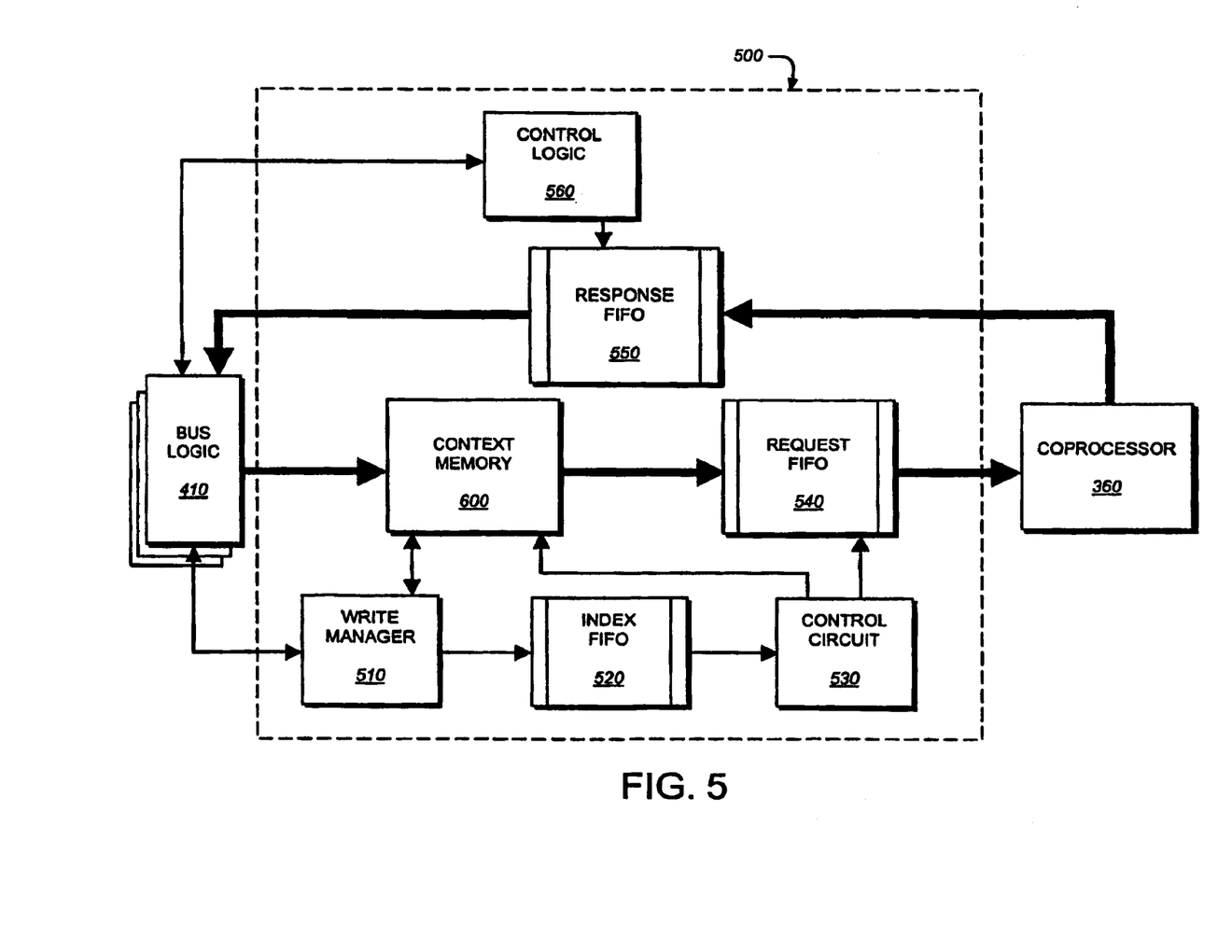
FIG. 5 is a schematic block diagram of a feeder circuit, according to the invention, that may be implemented in the ASIC of FIG. 4.

FIG. 5 illustrates a feeder circuit 500 embodying the present invention. As shown, the bold lines indicate a data path through the feeder circuit, and the thin lines represent control and/or address paths. Illustratively, a request for the coprocessor 360 is sent from an I/O device 330 (not shown) and is received by bus logic 410. The bus logic forwards the request to a context memory 600 in the feeder circuit. After the request has been fully transferred to the context memory, it is passed from the context memory to a request FIFO 540 coupled to the coprocessor. When the request reaches the head of the request FIFO, it is forwarded to the coprocessor and processed. If appropriate, the coprocessor returns a corresponding response to a response FIFO 550. The original request may indicate where to send its corresponding response (i.e., to an I/O device or memory location) or, alternatively, the coprocessor may determine where to return the response. When the response reaches the head of the response FIFO, it is then transferred to the bus logic and returned to, e.g., one or more of the I/O devices.

A write manager 510 directs requests received by the bus logic to addressed locations in a remote memory or context memory 600 coupled to the coprocessor 360. Because system limitations, such as bus bandwidth, software protocols, memory latencies, etc., may prevent an I/O device from transferring a request in a single transmission to the bus logic, the I/O device instead may transfer the request as a series of segments. Thus, the write manager routes segments received from a plurality of I/O devices to respective areas in the context memory. Preferably, each received segment identifies a target location at which it is stored in the context memory. The target address of the context memory may be determined by software and/or hardware controls in the requesting I/O device. Since segments may be sent from numerous I/O devices, via their respective bus logic 410, the write manager may be configured to manage the received segments in a predefined order, e.g. "round-robin," or in parallel. Additionally, the write manager may implement conventional flow control and "hand-shaking" procedures for data transfers into the context memory.

When the write manager detects a request is fully assembled in the context memory (i.e., all its segments are stored and ordered in the context memory) the write manager enqueues a corresponding index to an index FIFO 520. In this way, indexes are enqueued according to the order in which requests are assembled in the context memory. In addition, the write manager may selectively "lock" portions of the context memory to protect assembled requests from being overwritten, e.g., by setting an appropriate valid bit 630. That is, the write manager may prevent future requests from overwriting a range of memory addresses that store a request that has not yet been transferred to the coprocessor.

A control circuit 530 reads an index at the head of the index FIFO and transfers the request associated with the index from the context memory to a request FIFO 540. If the request FIFO 540 does not have room for additional data, then the above operation is deferred until there is enough room. Once the request has been forwarded to the request FIFO, the control circuit may "unlock" the portion of the context memory where the assembled request was previously stored, e.g., by clearing an appropriate valid bit 630. Requests are then transferred from the request FIFO to the coprocessor 360. In effect, the request FIFO is used as a buffer memory between the context memory and the coprocessor. Alternatively, if data transfers out of the context memory and into the coprocessor are synchronized (i.e., "time-matched"), the control circuit may forward requests directly from the context memory to the coprocessor.

Similarly, the response FIFO 550 is used as a buffer memory between the coprocessor and the bus logic 410. A control logic 560 coupled to the response FIFO manages data transfers into and out of the response FIFO and may implement conventional flow control and "hand-shaking" procedures with the bus logic. However, if data transfers out of the coprocessor and data transfers into the bus logic are synchronized (i.e., "time-matched"), the coprocessor may forward responses directly to the bus logic.

Figure 6:
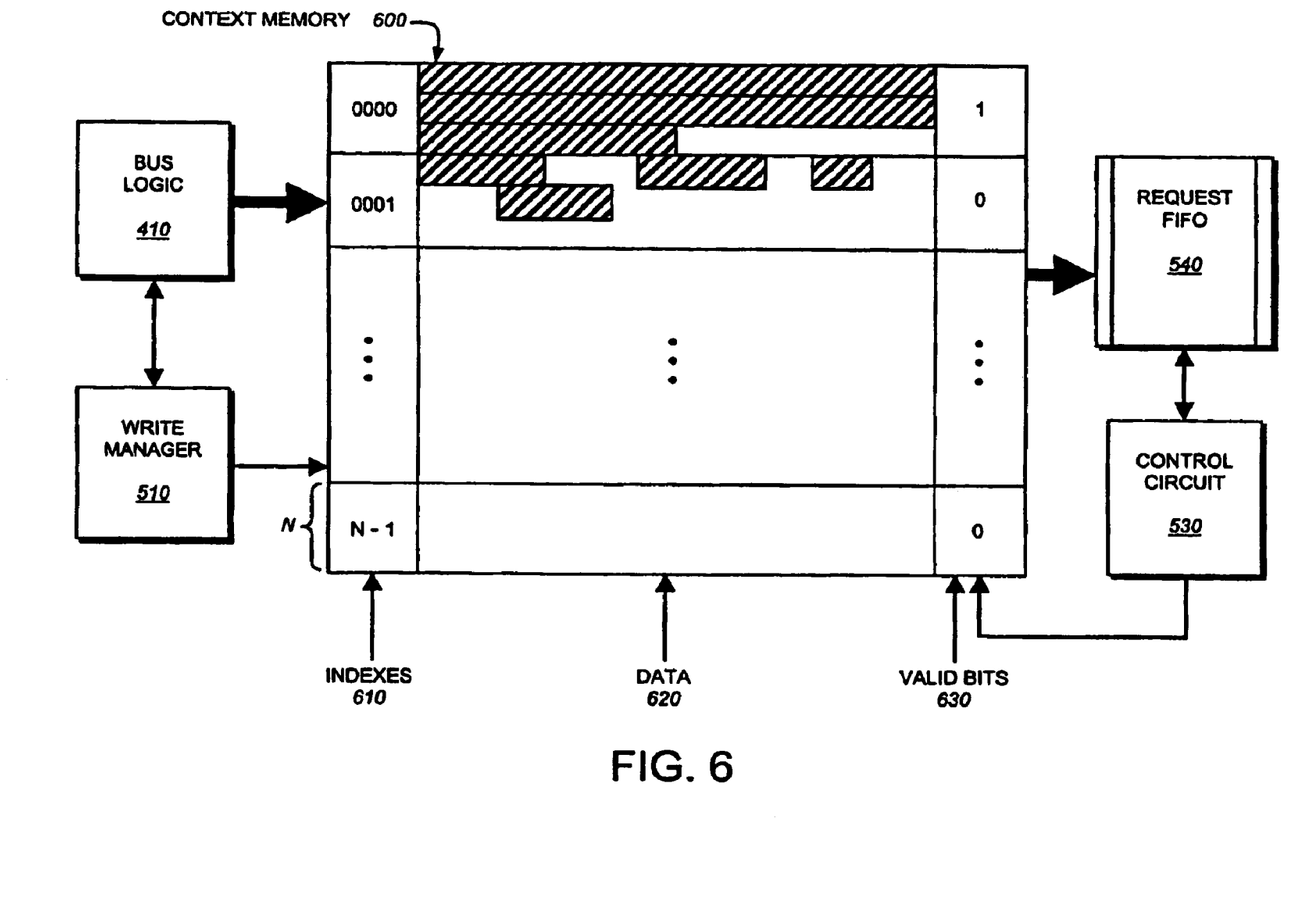
FIG. 6 is a schematic block diagram of a context memory within the feeder circuit of FIG. 5.

FIG. 6 is a schematic block diagram illustrating a context memory 600 according to the invention. The context memory comprises (N) discrete memory blocks to which the write manager 510 concurrently assembles requests for the coprocessor. The blocks of context memory, shown in FIG. 6, are a fixed size (W) starting at predetermined addresses, although it is expressly contemplated the blocks may be variable sizes according to static or dynamic memory allocation. As shown, the context memory may comprise any arbitrary number of memory blocks, each having an associated index 610, e.g., zero through N−1. Additionally, each memory block is associated a data section 620 and a valid bit 630.

The bus logic 410 receives segments from multiple I/O devices, e.g. processors. Each segment may indicate where in the context memory its data should be stored, or, alternatively, the write manager 510 may be configured to determine where the segment is stored. For example, each segment may include an index or a logical address of an associated memory block. Upon receiving a segment by the bus logic, the write manager directs the received data to the data section 620 of its addressed memory block. The write manager thereby organizes the segments in the memory blocks of the context memory according to predetermined ordering rules, such as sequentially appending the received segments in their addressed memory locations. In the exemplary context memory 600, shaded regions illustrate where the segments data have been sequentially or randomly placed in blocks 0000 and 0001 of the context memory. Advantageously, the write manager may concurrently assemble requests from multiple I/O devices by organizing received segments in one or more of the memory blocks. Further, the write manager may concurrently assemble multiple requests from a single I/O device.

Because an assembled request may be smaller than its associated block of the context memory, the write manager detects when the last segment has been received for a request. More specifically, when an I/O device transfers the last segment of a request, software and/or hardware controls in the device may set a predetermined address bit, e.g. an upper order bit or unused address bit, to indicate transmission of the request is complete. Additionally, a separate mechanism may be used to indicate that all segments have been transferred, such as updating a status register. Thus, the write manager organizes received segments in a block of the context memory until a segment designating the memory block is detected having the predetermined address bit set.

Upon detecting the last segment of a request, the write manager finishes assembling the request and sets a valid bit 630 associated with the memory block storing the assembled request. By setting a valid bit associated with a block of the context memory, the write manager "locks" the memory block to prevent future requests from overwriting the data in its data section 620. That is, the valid bit indicates its associated memory block comprises an assembled request that may be forwarded to the coprocessor, and the write manager does not parse new segments to the memory block until the valid bit is reset. In the exemplary memory 600, a valid bit equal to "1" indicates block 0000 stores a fully assembled request, whereas a valid bit equal to "0" indicates blocks 0001 and N−1 comprise a partial request (0001) or no data at all (N−1).

According to the invention, when a request has been fully assembled in the context memory, the write manager enqueues a corresponding index to the index FIFO 520. In this way, indexes are enqueued according to the order in which requests are assembled in the context memory. Control circuit 530 reads an index at the head of the index FIFO and transfers the request associated with the index from the context memory to request FIFO 540. Once the request has been forwarded to the request FIFO, the control circuit may "unlock" the block of the context memory where the assembled request was previously stored by resetting its associated valid bit. In alternative embodiments, the valid bits may not be reset until the coprocessor has finished processing the assembled requests. In this case, the control circuit 530 may not be responsible for resetting the valid bits, and instead the valid bits may be reset by another source, such as the write manager.

Figure 7:
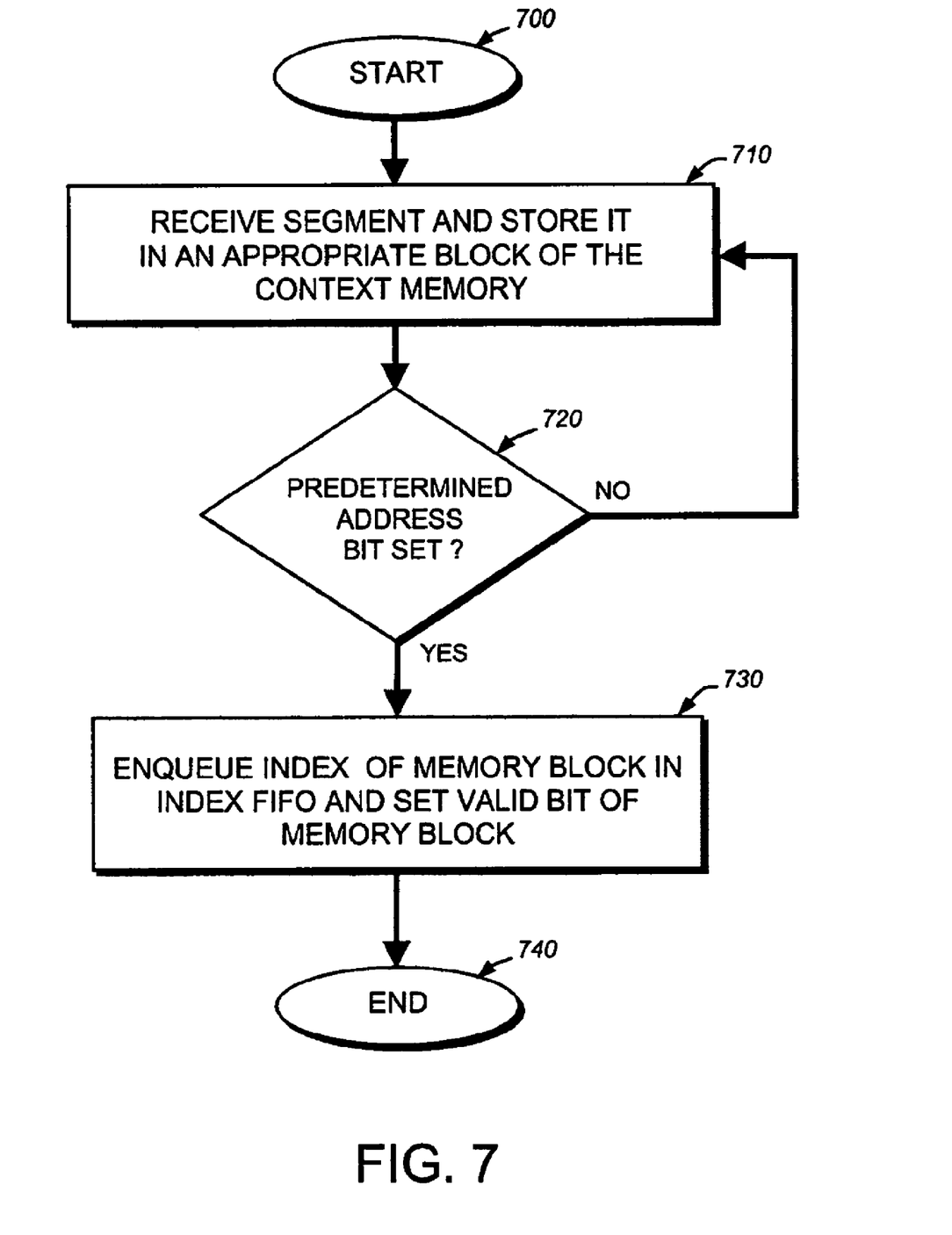
FIG. 7 is a flowchart illustrating a sequence of steps for assembling a request in a block of the context memory illustrated in FIG. 6.

FIG. 7 illustrates a sequence of steps for assembling a request in a block of the context memory 600. The sequence starts at step 700 and continues to step 710 where a write manager receives a segment from an I/O device and stores the segment in an appropriate block of a context memory. The received segment may indicate where in the context memory it should be stored, or, alternatively, the write manager may be configured to determine where to store the segment. At step 720, the write manager checks whether a predetermined address bit, e.g. an upper order bit, is set in the received segment. The predetermined address bit may indicate whether the received segment is the last transfer of a request for a coprocessor. If the predetermined address bit is not set, the write manager stores another received segment as shown in step 710.

However, if the write manager detects the predetermined address bit is set, then, at step 730, the write manager finishes assembling the request in a block of the context memory and enqueues the index of the memory block in an index FIFO. Additionally, at step 730, the write manager sets a valid bit for the memory block indicating the block stores an assembled request for the coprocessor. The set valid bit also indicates the write manager may not assemble new requests in the memory block. The sequence ends at step 740.

Figure 8:
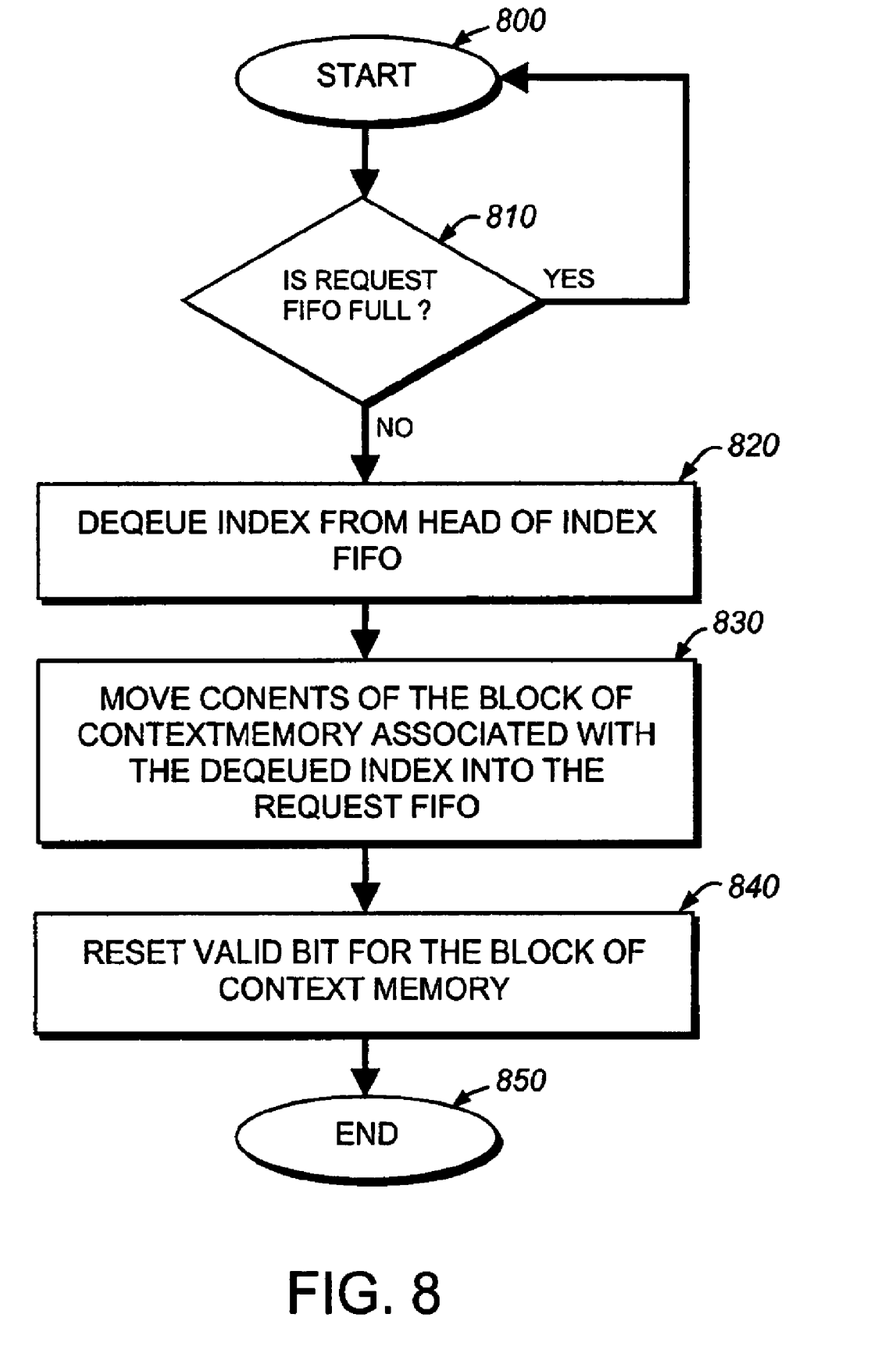
FIG. 8 is a flowchart illustrating a sequence of steps for transferring a request from the context memory, illustrated in FIG. 6, to a coprocessor.

FIG. 8 is a flowchart illustrating a sequence of steps for transferring a request from the context memory to a coprocessor. The sequence starts at step 800 and continues to step 810 where the request FIFO is examined to determine if it can store an additional request. If the request FIFO is full, the sequence starts over until an assembled request may be enqueued in the FIFO. On the other hand, if the request FIFO can store an additional request, at step 820, a control circuit dequeues an index from the head of the index FIFO. Next, at step 830, the control circuit moves the contents of the block of context memory associated with the dequeued index into a request FIFO. At step 840, the control circuit resets a valid bit associated with the memory block to indicate a write manager may begin to assemble a new request in the block of context memory. The sequence ends at step 850.

C. CONCLUSION

The foregoing has been a detailed description of an illustrative embodiment of the invention. Various modifications and additions can be made without departing from the spirit and scope of the invention. For example, instead of implementing software and/or hardware controls in each I/O device to determine where a request is assembled in the context memory, the write manager may be configured to manage where the requests are assembled. Additionally, the valid bits described herein are used to "lock" a block of context memory from being overwritten, although it is within the scope of the present invention to implement the context memory without valid bits. That is, the I/O devices, write manager, and/or other circuitry may equivalently monitor where fully assembled requests are stored in the context memory to ensure received segments do not overwrite assembled requests that have not been forwarded to the coprocessor. Furthermore, one or more I/O devices may signal the last segment of a request is transmitted without setting a predetermined address bit. In other words, the write manager may instead check the status of a flag bit or may receive a separate control packet to indicate the last segment of a request is received. It is also expressly contemplated that the write manager may return one or more acknowledgement messages to the I/O devices, e.g., to indicate the last segment of a request has been received.

While this description has been written in reference to an ASIC in an intermediate network node, the principles are equally pertinent to any device that concurrently assembles requests from a multitude of I/O devices and forwards those requests serially to a coprocessor. In addition, it is expressly contemplated that the teachings of this invention can be implemented as software, including a computer-readable medium having program instructions executing on a computer, hardware, firmware, or a combination thereof. Accordingly this description is meant to be taken only by way of example and not to otherwise limit the scope of the invention.

What is claimed is:

1. A multiprocessor enqueue circuit that enables communications between a plurality of I/O devices and a coprocessor, whereby the coprocessor assists with execution of network services in an intermediate network node, the multi-processor enqueue circuit comprising:

a context memory having indexed memory blocks configured to store requests that are assembled at the context memory from a plurality of segments transmitted to the context memory by the I/O devices, the I/O devices located internal to the intermediate network node;

an index FIFO coupled to the context memory and adapted to store an order in which requests are completed being assembled in the indexed memory blocks; and a control circuit that transfers assembled requests from the context memory to the coprocessor in the order.

2. The circuit of claim 1, wherein each indexed memory block of the context memory further comprises:

an index that identifies the memory block;

a data section configured to store a request for the coprocessor; and a valid bit that indicates whether the memory block stores a fully assembled request.

3. The circuit of claim 2, further comprising a request FIFO that receives assembled requests from the context memory and forwards the assembled requests to the coprocessor.

4. The circuit of claim 3, wherein the control circuit performs the following steps:

(a) dequeues an index at the head of the index FIFO;

(b) transfers an assembled request from the block of the context memory associated with the dequeued index to the request FIFO; and (c) resets the valid bit for the block of the context memory associated with the dequeued index.

5. The circuit of claim 2, further comprising a write manager that facilitates the assembly of multiple requests for the coprocessor, the requests sent from the plurality of I/O devices.

6. The circuit of claim 5, wherein the write manager checks a predetermined condition to determine whether a received segment is the last segment in a request.

7. The circuit of claim 6, wherein the predetermined condition is based on whether a predetermined address bit is set in the received segment.

8. The circuit of claim 6, wherein upon detection of the predetermined condition, the write manager performs the following steps:

(a) finishes assembling the request in an indexed block of the context memory;

(b) sets the valid bit associated with the indexed block of the context memory; and (c) enqueues the index associated with the indexed block of the context memory in the index FIFO.

9. The circuit of claim 1, wherein each of the I/O devices is a processor that is located internal to the intermediate network device.

10. The circuit of claim 9, wherein the processors are interconnected with the coprocessor by a split transaction bus.

11. The circuit of claim 1, wherein the context memory is coupled to the coprocessor and the indexed memory blocks are further configured to store the requests as physically assembled requests in contiguous memory locations.

12. A method for concurrently assembling multiple requests received from a plurality of I/O devices and forwarding the requests to a coprocessor, the method comprising the steps:

(a) receiving a segment from one of the plurality of I/O devices;

(b) directing the received segment to a block of a context memory based on address information in the received segment;

(c) determining whether a predetermined address bit is set in the received segment; and (d) enqueueing an index associated with the block of the context memory in an index FIFO and setting a valid bit associated with the block of the context memory, upon determining the predetermined address bit is set.

13. The method of claim 12, further comprising the steps:

(e) dequeueing an index stored at a predetermined location in the index FIFO;

(f) transferring the contents of a block of the context memory associated with the dequeued index to the coprocessor; and (g) resetting the valid bit for the block of the context memory associated with the dequeued index.

14. A multiprocessor enqueue circuit that enables a plurality of I/O devices to concurrently assemble requests for a coprocessor, the multiprocessor enqueue circuit comprising:

(a) means for receiving a segment from one of the plurality of I/O devices;

(b) means for directing the received segment to a block of a context memory based on address information in the received segment;

(c) means for determining whether a predetermined address bit is set in the received segment;

(d) means for enqueuing an index associated with the block of the context memory in an index FIFO upon determining the predetermined address bit is set; and (e) means for setting a valid bit associated with the block of the context memory upon determining the predetermined address bit is set.

15. The circuit of claim 14, further comprising:

(f) means for dequeueing an index stored at a predetermined location in the index FIFO;

(g) means for transferring the contents of a block of the context memory associated with the dequeued index to the coprocessor; and (h) means for resetting the valid bit for the block of the context memory associated with the dequeued index.

16. A method for transferring a block of data to a coprocessor in a network node, the method comprising:

receiving bus packets from a plurality of sources internal to the network node, each bus packet containing a portion of the data;

storing the received portions of data in a memory having a plurality of memory areas, each memory area configured to store multiple portions of data received from a particular source; and transferring from the memory, in response to receiving a last bus packet indicating that all of the data has been received from a particular source, the multiple portions of data received from the particular source to the coprocessor.

17. The method of claim 16, further comprising:

setting a flag in response to receiving the last bus packet from the particular source.

18. The method of claim 17, wherein the flag is a predetermined bit associated with the memory area containing the data received from the particular source.

19. The method of claim 16, further comprising:

determining that the last bus packet has been received from the particular source based on the value of a predetermined address bit stored in the last bus packet.

20. The method of claim 16, wherein the step of storing the received portions of data in a memory further comprises:

associating an area of the memory with the particular source; and storing portions of data received from the particular source in the source's associated memory area.

21. An apparatus for transferring a block of data to a coprocessor in a network node, the apparatus comprising:

means for receiving bus packets from a plurality of sources internal to the network node, each bus packet containing a portion of the data;

means for storing the received portions of data in a memory having a plurality of memory areas, each memory area configured to store multiple portions of data received from a particular source; and means for transferring from the memory, in response to receiving a last bus packet indicating that all of the data has been received from a particular source, the multiple portions of data received from the particular source to the coprocessor.

22. The apparatus of claim 21, further comprising:

means for setting a flag in response to receiving the last bus packet from the particular source.

23. The apparatus of claim 22, wherein the flag is a predetermined bit associated with the memory area containing the data received from the particular source.

24. The apparatus of claim 21, further comprising:

means for determining that the last bus packet has been received from the particular source based on the value of a predetermined address bit stored in the last bus packet.

25. The apparatus of claim 21, further comprising:

means for associating an area of the memory with the particular source; and means for storing portions of data received from the particular source in the source's associated memory area.

26. A multiprocessor enqueue circuit that enables a plurality of devices to assemble requests for a coprocessor, the circuit comprising:

a context memory having a plurality of indexed memory blocks configured to store coprocessor requests concurrently assembled at the context memory from a plurality of segments transmitted to the context memory by the plurality of devices, each indexed memory block being configured to store a different request for the coprocessor; and a first-in, first-out (FIFO) queue coupled to the context memory and adapted to store an order in which requests are completed being assembled in the indexed memory blocks by the plurality of devices.

27. The circuit of claim 26, wherein each indexed memory block of the context memory further comprises:

an index value that uniquely identifies the memory block in the context memory;

a data section configured to store a request for the coprocessor; and a valid bit indicating whether the memory block stores a fully assembled request.

28. The circuit of claims 26, wherein the write manager checks a predetermined condition to determine whether a received segment is the last segment in a request.

29. The circuit of claim 28, wherein the predetermined condition is based on whether a predetermined address bit is set in the received segment.

30. The circuit of claim 28, wherein in response to detecting that the received segment is the last segment in a coprocessor request, the write manager is configured to:

(a) store the received segment in an indexed block of the context memory containing the coprocessor request;

(b) set the valid bit associated with the indexed block of the context memory; and
(c) enqueue the index associated with the indexed block of the context memory in the FIFO queue.

31. The circuit of claim 26, further comprising:
a control circuit configured to:
(a) dequeue an index at the head of the FIFO queue;
(b) transfer an assembled request from the block of the context memory associated with the dequeued index to a second FIFO queue; and
(c) reset the valid bit for the block of the context memory associated with the dequeued index.

32. A method for a plurality of devices to assemble requests for a coprocessor, the method comprising:
receiving request segments from the plurality of devices; and
concurrently assembling different requests for the coprocessor from the request segments, each different request assembled in a separate area of a context memory coupled to the coprocessor; and
forwarding assembled requests from the context memory to the coprocessor in the order in which the requests are completed being assembled in the context memory.

33. The method of claims 32, further comprising:
transmitting request segments from the plurality of devices to the context memory in a predetermined order.

34. The method of claim 33, wherein the predetermined order is a round-robin ordering scheme for transmitting the request segments from the plurality of devices.

35. The method of claim 32, further comprising:
receiving request segments from the plurality of devices, at least two of the devices transmitting their request segments to the context memory substantially simultaneously; and
storing each received request segment in an area of the context memory containing a coprocessor request including the received request segment.

36. The method of claim 32, further comprising:
storing the order in which the coprocessor requests are assembled in the context memory in a first-in, first-out (FIFO) queue.

37. The method of claim 36, further comprising:
associating a unique index value with each area in the context memory; and
storing an ordered sequence of index values in the FIFO queue, the ordered sequence of index values indicating the order in which coprocessor requests are assembled in the context memory.

38. The method of claim 32, further comprising:
associating a valid bit with at least one area of the context memory; and
setting the valid bit when a full coprocessor request has been assembled in the area of the context memory associated with the valid bit.

39. A computer-readable media storing executable program instructions for assembling requests for a coprocessor, the executable program instructions comprising program instructions when executed perform the method of:
receiving request segments from a plurality of devices;
concurrently assembling different requests for the coprocessor from the request segments, each different request assembled in a separate areas of a context memory coupled to the coprocessor; and
forwarding assembled requests from the context memory to the coprocessor in the order in which the requests are completed being assembled in the context memory.

40. A method for transferring a block of data to a coprocessor, the method comprising:
receiving bus packets from a plurality of sources, each bus packet containing a portion of the data;
storing the received portions of data in a memory having a plurality of memory areas, each memory area configured to store multiple portions of data received from a different source, at least two of the memory areas being concurrently accessible to the plurality of sources; and
transferring from the memory, in response to receiving a last bus packet indicating that all of the data has been received from a particular source, the multiple portions of data received from the particular source to the coprocessor.

41. The method of claim 40, further comprising:
setting a flag in response to receiving the last bus packet from the particular source.

42. The method of claim 41, wherein the flag is a predetermined bit associated with the memory area containing the data received from the particular source.

43. The method of claim 40, further comprising:
determining that the last bus packet has been received from the particular source based on the value of a predetermined address bit stored in the last bus packet.

44. The method of claim 40, wherein the step of storing the received portions of data in a memory further comprises:
associating an area of the memory with the particular source; and
storing portions of data received from the particular source in the source's associated memory area.

* * * * *